US011204712B2

United States Patent
Lin et al.

(10) Patent No.: US 11,204,712 B2
(45) Date of Patent: Dec. 21, 2021

(54) USING MIRROR PATH STATISTICS IN RECALLING EXTENTS TO A PRIMARY STORAGE SYSTEM AND A SECONDARY STORAGE SYSTEM FROM A THIRD STORAGE SYSTEM

(71) Applicant: International Business Machines Corporation, Armonk, NY (US)

(72) Inventors: Edward Hsiu-Wei Lin, Tucson, AZ (US); Lokesh Mohan Gupta, Tucson, AZ (US); Clint A. Hardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/792,061

(22) Filed: Feb. 14, 2020

(65) Prior Publication Data
US 2021/0255772 A1    Aug. 19, 2021

(51) Int. Cl.
*G06F 3/06* (2006.01)
*G06F 11/07* (2006.01)

(52) U.S. Cl.
CPC .............. *G06F 3/065* (2013.01); *G06F 3/067* (2013.01); *G06F 3/0619* (2013.01); *G06F 11/076* (2013.01); *G06F 11/0709* (2013.01); *G06F 11/079* (2013.01); *G06F 11/0727* (2013.01)

(58) Field of Classification Search
CPC .............. G06F 11/0709; G06F 11/0727; G06F 11/076; G06F 11/079; G06F 3/065; G06F 3/0619; G06F 3/067
See application file for complete search history.

(56) References Cited

U.S. PATENT DOCUMENTS

| 8,234,471 | B2 | 7/2012 | Ito et al. |
| 8,468,133 | B2 | 6/2013 | Chiu et al. |
| 8,473,465 | B2 | 6/2013 | Petruzzo |
| 9,229,661 | B2 | 1/2016 | Rehm et al. |
| 9,323,758 | B1 | 4/2016 | Stacey et al. |
| 9,344,498 | B2 | 5/2016 | Clayton et al. |
| 9,495,262 | B2 | 11/2016 | Miller et al. |
| 9,563,452 | B2 | 2/2017 | Hudzia et al. |

(Continued)

OTHER PUBLICATIONS

Notice of Allowance dated Jan. 7, 2021, pp. 17, for U.S. Appl. No. 16/455,544, filed Jun. 26, 2019.

(Continued)

*Primary Examiner* — Jigar P Patel
(74) *Attorney, Agent, or Firm* — Konrad, Raynes, Davda and Victor LLP; David W. Victor (57) ABSTRACT

Provided are a computer program product, system, and method for using mirror path statistics in recalling extents to a primary storage system and a secondary storage system from a third storage system, A recall request is received to recall extents from the third storage that were migrated from the primary storage or the secondary storage to the third storage. A determination is made as to whether mirror paths used to migrate extents from the primary storage to the secondary storage exceed a degradation criteria. Commands are sent to cause the recall extents to be recalled from the third storage to both the primary storage and the secondary storage in response to determining that the mirror paths exceed the degradation criteria.

20 Claims, 7 Drawing Sheets

(56) References Cited

U.S. PATENT DOCUMENTS

| | | | |
|---|---|---|---|
| 2009/0300283 | A1 | 12/2009 | Kudo |
| 2012/0203999 | A1 | 8/2012 | Jess |
| 2015/0205674 | A1 | 7/2015 | Schroth et al. |
| 2017/0010826 | A1 | 1/2017 | Basham et al. |
| 2017/0161349 | A1 | 6/2017 | Harris, Jr. et al. |
| 2017/0262346 | A1 | 9/2017 | Pradhan et al. |
| 2018/0267723 | A1* | 9/2018 | McBride .................. G06F 11/16 |
| 2018/0357246 | A1 | 12/2018 | Strogov et al. |
| 2020/0034077 | A1 | 1/2020 | Haravu et al. |
| 2020/0142595 | A1 | 5/2020 | Chan |
| 2020/0379647 | A1 | 12/2020 | Ikeda |
| 2020/0409913 | A1 | 12/2020 | Lin et al. |
| 2021/0109818 | A1* | 4/2021 | Perneti .................. G06F 3/0617 |

OTHER PUBLICATIONS

Notice of Allowance, dated Apr. 9, 2021, for U.S. Appl. No. 16/792,032, filed Feb. 14, 2020, Total 22 pages.

List of Patents and Publications Treated as Related, dated Feb. 14, 2020, Total 2 pages.

U.S. Appl. No. 16/455,544, filed Jun. 27, 2019 "Split Data Migration in a Data Storage System", by Lin et al. (18.872), 56 pages.

U.S. Appl. No. 16/792,032, filed Feb. 14, 2020 Using Storage Access Statistics to Determine Mirrored Extents To Migrate From a Primary Storage System and a Secondary Storage System to a Third Storage System Lin et al. (18.910), 37 pages.

Stanley, "IBM DS8870 Multiple Target Peer-to-Peer Remote Copy", IBM International Technical Support Organization (2015), Total 126 pages.

Yudenfreund, "Enhancing Value to Existing and Future Workloads with IBM z13." Ibm.com/redbooks (215), (Background) Total 9 pages.

B. Calder, et al., "Windows Azure Storage: a highly available cloud storage service with strong consistency". Proceedings of the Twenty-Third ACM Symposium on Operating Systems Principles, 2011, pp. 143-157.

Seipp et al., "Multi-cloud with Transparent Cloud Tiering", dated 2018, IBM Corporation, Total 38 pages.

J.G. Biondo, Jr., et al., "IBM DS8880 and z/OS DFSMS: Transparent Cloud Tiering", IBM Corporation, IBM Redbooks, Document No. SG24-8381-01, Apr. 2018, pp. 98.

* cited by examiner

Access Statistics

USING MIRROR PATH STATISTICS IN RECALLING EXTENTS TO A PRIMARY STORAGE SYSTEM AND A SECONDARY STORAGE SYSTEM FROM A THIRD STORAGE SYSTEM

BACKGROUND OF THE INVENTION

1. Field of the Invention

The present invention relates to a computer program product, system, and method for using mirror path statistics in recalling extents to a primary storage system and a secondary storage system from a third storage system.

2. Description of the Related Art

Data backup systems can provide continuous availability of production data in the event of a sudden catastrophic failure at a single point in time or data loss over a period of time. In one such disaster recovery system, production data is replicated from a primary storage system to a secondary storage system. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror.

Data mirrored between and stored in a primary storage system and secondary storage system may be migrated to remote cloud storage and then recalled when later needed. Data mirrored in a synchronous replicated environment may be migrated from and recalled to the primary server in the mirror relationship. When recalling data in cloud storage to the primary storage server, the recall is not complete until the recalled data is migrated back to the secondary storage server. One such program for migrating and recalling mirrored data is International Business Machine Corporation's Transparent Cloud Tiering product.

There is a need in the art for improved techniques for migrating and recalling mirrored data stored in primary and second storage systems with respect to a remote storage, such as remote cloud storage.

SUMMARY

Provided are a computer program product, system, and method for using mirror path statistics in recalling extents to a primary storage system and a secondary storage system from a third storage system, A recall request is received to recall extents from the third storage that were migrated from the primary storage or the secondary storage to the third storage. A determination is made as to whether mirror paths used to migrate extents from the primary storage to the secondary storage exceed a degradation criteria. Commands are sent to cause the recall extents to be recalled from the third storage to both the primary storage and the secondary storage in response to determining that the mirror paths exceed the degradation criteria.

DETAILED DESCRIPTION

To migrate mirrored data to remote cloud storage and recall the mirrored data from the remote call storage, the migration operations may be split between the primary storage server and secondary storage server. If both the primary and secondary storage servers are involved in recalling migrated data, then traffic on the mirror paths is reduced because recalled data does not have to be mirrored to the secondary storage server.

Described embodiments provide improvements to computer technology for migrating data using both the primary and secondary storage server by considering access statistics for sections of the primary and secondary storages including the data extents to migrate. The access statistics are used to have the primary storage server, which is usually the production server receiving host Input/Output ("I/O") requests, handle migration for mirrored extents that are on sections of the primary storage system experiencing a relatively lower level of access on the primary storage system and have the secondary storage system handle the migration for mirrored extents that are on sections of the primary storage experiencing a relatively higher level of access. This technique reduces the processing burdens on the primary storage server because the primary storage server avoids having to migrate mirrored data with respect to ranks or sections of the primary storage that are already experiencing a high level of host access. The secondary storage server, which is typically not handling host I/O requests, may handle the migration of mirrored data on storage sections of the primary storage server experiencing a high level of access to reduce processing burdens for high access regions of the primary storage.

Described embodiments further provide improvements to computer technology for recalling data using the primary and secondary storage servers by considering path statistics for mirror paths used to mirror data between the primary storage server and the secondary storage server. The described embodiments determine whether the mirror paths are degraded and, if so, select to use both the primary and secondary storage servers to separately call data from the third storage to avoid having to mirror recalled data on the degraded mirror paths if only the primary storage server is used for migration In making the determination of sufficiently degraded performance, the migration/recall manager may consider degradation criteria indicating degradation, such as bandwidth utilization, high response time, unacceptable ratio of successful transfers, and high failure rate mode, in the mirror paths. If the mirror paths are not degraded, then the data may be recalled by only the primary storage server and then mirrored to the secondary storage server over the mirror paths.

Figure 1:
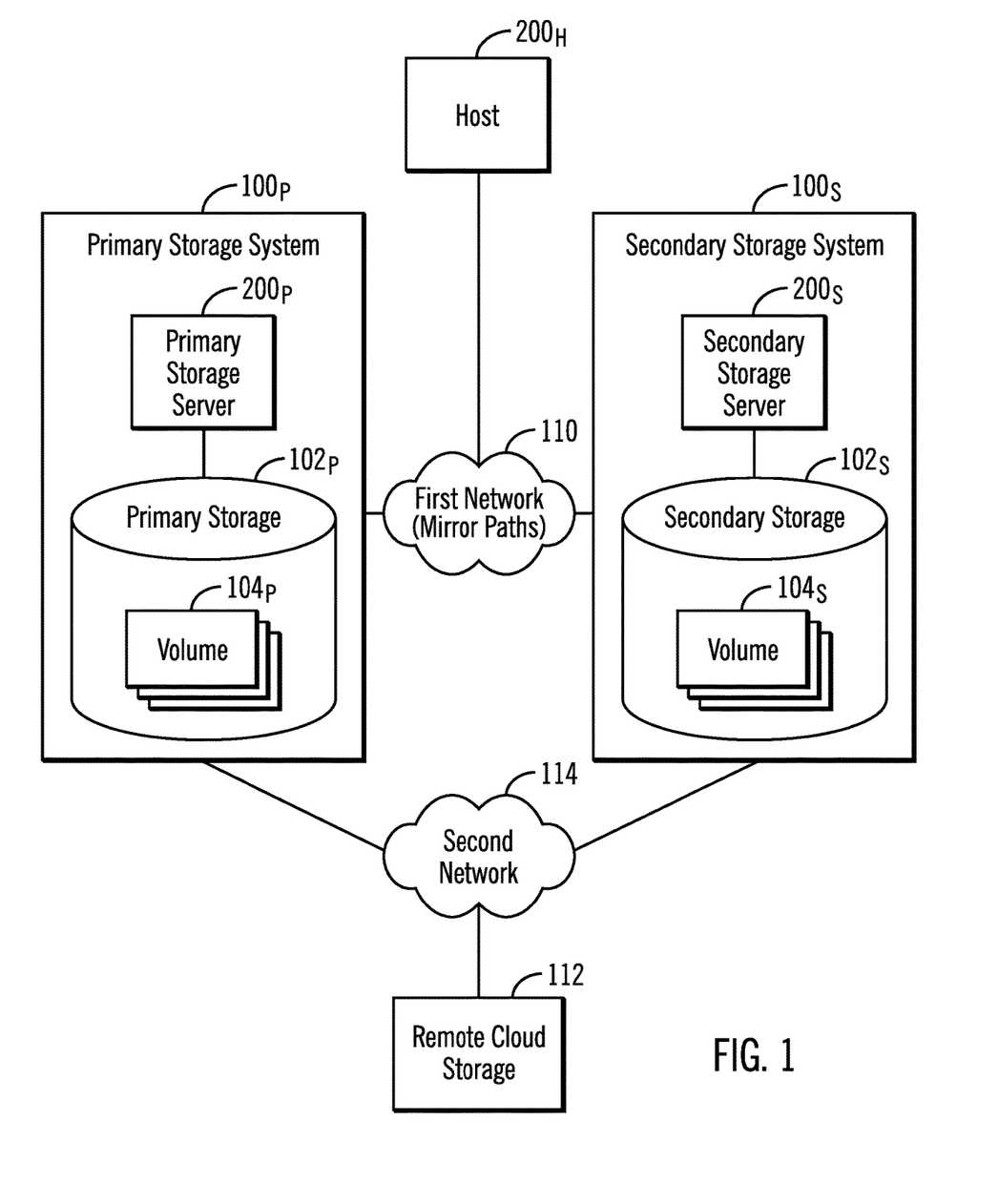
FIG. 1 illustrates an embodiment of a data replication environment.

FIG. 1 illustrates an embodiment of a data replication environment having a primary storage system $100_P$ including a primary storage server $200_P$ managing access to a primary storage $102_P$ and secondary storage system $100_S$, each including storage servers $200_1$ and $200_2$, respectively, managing access to volumes $104_P$ and $104_S$ configured in storages $102_P$ and $102_S$. One or more hosts $200_H$ may direct I/O requests to the primary storage system $100_P$ or secondary storage system $100_S$, where the primary storage system $100_P$ may comprise a production storage to which most I/O requests are directed, and the secondary storage system $100_S$ is used mostly for mirroring data in case of a failover. The primary storage server $200_P$ may mirror data in the primary volumes $104_P$ to the secondary storage system $100_S$, also referred to a secondary storage or target storage, to maintain data in consistency groups at the second storage server $200_2$. Data may be mirrored synchronously, such that a write to the primary storage server $200_P$ is not considered complete until the data is transferred to the secondary storage server $200_S$. The data may be mirrored over a first network 110 having paths mirror for migrating data between the primary storage system $100_P$ and the secondary storage system $100_S$.

Data in the volumes $104_P$, $104_S$ may be configured in ranks, where a rank is comprised of multiple extents, and wherein each extent is comprised of numerous tracks. Other storage units may be used than ranks, extents, and tracks. For instance, the volumes may comprise logical devices or drives configured in sections or partitions of storage other than ranks, that are comprised of groups of blocks or tracks. The term "rank" as used herein may refer to any section or area of storage having groups of tracks or blocks, referred to as extents.

The primary storage server $200_P$ and the secondary storage server $200_S$ may each migrate mirrored extents of data in the volumes $104_P$ and $104_S$ to a remote cloud storage 112 over a second network 114. The remote cloud storage 112 may comprise a cloud storage system provided by a cloud storage service provider. Examples of cloud storage 112 service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The term "storage system" as used herein may refer to a storage server $200_P$, $200_S$ and/or the storage $102_P$, $102_S$ managed by the server. The term "server" or "storage server" may be used to refer to the servers $200_P$, $200_S$ The storages $102_P$, $102_S$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_P$, $104_S$ may further be configured from an array of devices, such as Just a Bunch of Disks (JBOD), Direct Access Storage Device (DASD), Redundant Array of Independent Disks (RAID) array, virtualization device, etc. Further, the storages $102_P$, $102_S$ may comprise heterogeneous storage devices from different vendors and different types of storage devices, such as a first type of storage devices, e.g., hard disk drives, that have a slower data transfer rate than a second type of storage devices, e.g., SSDs.

The first network 110 used by the storage systems $100_1$ and $100_2$ to mirror data may comprise mirror paths configured in a storage network such as one or more interconnected Local Area Networks (LAN), Storage Area Networks (SAN), Wide Area Network (WAN), peer-to-peer network, wireless network, etc. The second network 114 may comprise a network accessible to a remote cloud storage 112, such as the Internet, a Wide Area Network (WAN). In alternative embodiments, the first 110 and second 114 networks may be the same network. For instance, the remote cloud storage 112 may comprise a third storage coupled to the first network 110.

Figure 2:
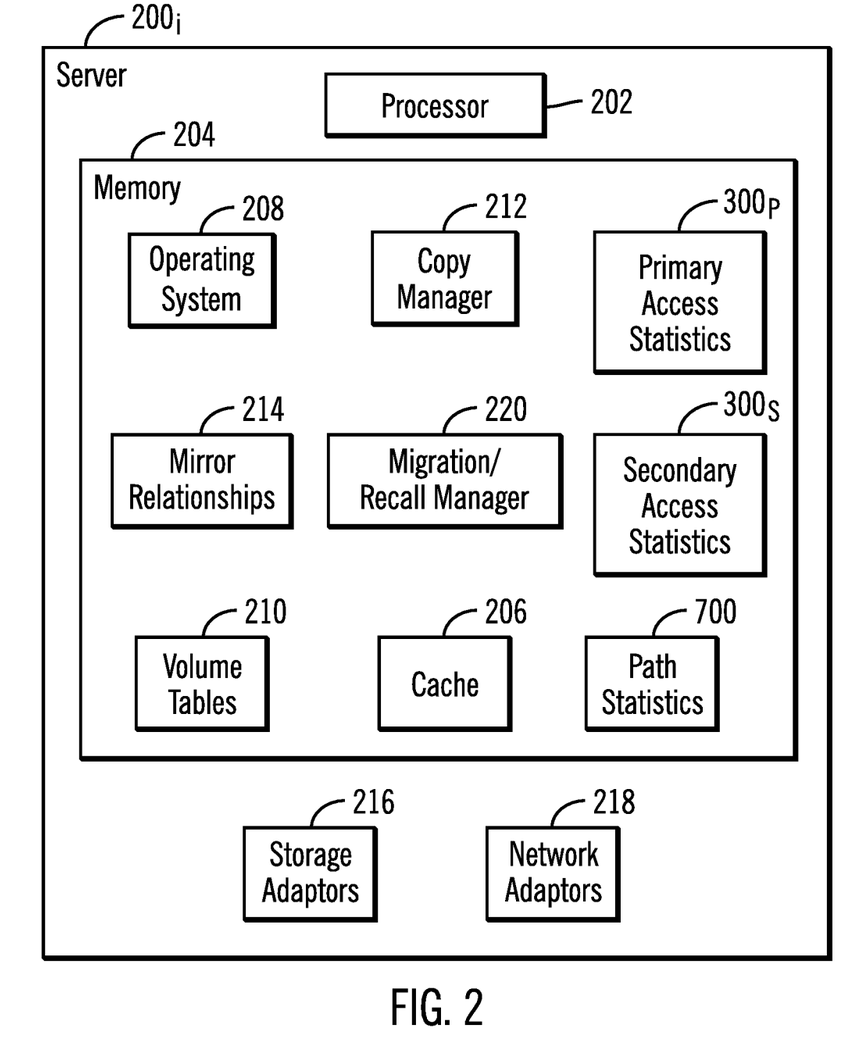
FIG. 2 illustrates an embodiment of components in a server in the replication environment of FIG. 1.

FIG. 2 provides an embodiment of components of a server $200_i$ involved in data mirroring, such as the primary storage server $200_P$, secondary storage server $200_S$, and host $200_H$. The server $200_i$ includes a processor 202 and a memory 204 including programs executed by the processor 202 as well as a cache 206 to cache read and write data for the first storage 1021. A portion of the cache 206 may also be used to mirror data in a consistency group.

The memory 204 includes an operating system 208, which configures and manages volumes in attached storage and maintains volume tables 210, such as a volume table of contents (VTOC), file allocation table, etc., providing information on the configured volumes 104. The operating system 208 further manages I/O requests with respect to the volumes $104_i$.

The memory 204 includes a copy manager 212 to create and manage mirror copy relationships 214 of source data extents in primary volumes $104_P$ in the primary storage system $100_P$, also referred to as source storage, to target data extents in the secondary storage system $100_S$, also referred to as the target storage, as part of consistency groups. In one embodiment, the primary storage system $100_P$ may have the source storage and the secondary storage system $100_S$ may have the target storage of mirror copy relationships to mirror source volumes or other data units to corresponding target volumes or data units. The copy manager 212 may mirror extents of tracks in the primary volume $104_P$ synchronously to a secondary volume $104_S$ in the secondary storage $102_S$ over mirror paths in the first network 100. Different data replication technologies may be used for the copy manager 212 to maintain remote copies of data at the secondary storage system $100_S$, such as International Business Machine Corporation's ("IBM") Metro Mirror Peer to Peer Remote Copy (PPRC), Extended Remote Copy (XRC), Coupled XRC (CXRC), Global Copy, and Global Mirror Copy, including programs provided by other vendors.

The server $200i$ includes one or more storage adaptors 216 to communicate with devices in the storage $102_i$ and one or more network adaptors 218 to communicate with the networks 110 and 114.

The server $200_i$ further includes a migration/recall manager 220 to manage the migration and recall of extents from the primary $102_P$ and secondary $102_S$ storages to the remote cloud storage 112 or other remote storage. For instance, the migration/recall manager 220 may create backup objects including mirrored extents mirrored between the primary storage $102_P$ and secondary storage $102_S$ to store or archive in the remote cloud storage 112. The migrated backup objects may be recalled from the remote cloud storage 112 to unpack and store the extents therein in the primary $102_P$ and secondary $102_S$ storages.

The server $200_i$ may further maintain primary access statistics $300_P$ having information on I/O accesses to ranks configured in the primary storage $102_P$ and secondary access statistics $300_S$ having information on I/O accesses to ranks configured in the secondary storage $102_S$. The primary storage server $200_P$ and secondary storage server $200_S$ may each gather access statistics $300_P$ and $300_S$, respectively, with respect to the primary storage $102_P$ and secondary storage $102_S$, respectively. The primary storage server $200_P$ and secondary storage server $200_S$ may transfer the access statistics $300_P$ and $300_S$ they each gather to each other to maintain and use during migration and recall operations. The server $200_i$ further includes path statistics 700 having information on bandwidth and performance metrics for mirror paths formed in the first network 110.

The program components in the memory 204, including 208, 212, 220, are shown in FIG. 2 as program code loaded into the memory 204 and executed by the processor 202. Alternatively, some or all of the components functions may be implemented in hardware devices, such as in Application Specific Integrated Circuits (ASICs), Field Programmable Gate Array (FPGA) or executed by separate dedicated processors.

The memory 204 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

Figure 3:
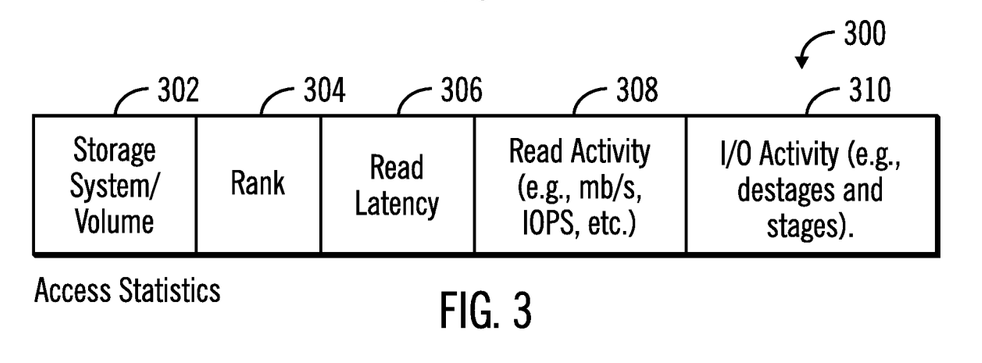
FIG. 3 illustrates an embodiment of access statistics used to determine whether to select the primary storage sever or secondary storage server to migrate and recall mirrored extents.

FIG. 3 illustrates an embodiment of access statistics 300 gathered for a volume, such as the primary $104_P$ and secondary $104_S$ volumes, and includes a storage system/volume 302 for which the statistics are gathered; the rank 304 or other section or grouping of data units, e.g., tracks, blocks, in the storage to which the statistics apply; a read latency 306 indicating an average time to process read requests to the rank 304; a read activity 308 indicating an amount of read activity toward the rank 304, such as throughput of reads, e.g., in megabytes per second, I/O Operations (IOPSs) per second, etc.; and an I/O activity 310 toward the rank 304, such as the combination of destage and stage operations toward tracks in the rank 304.

Figure 4:
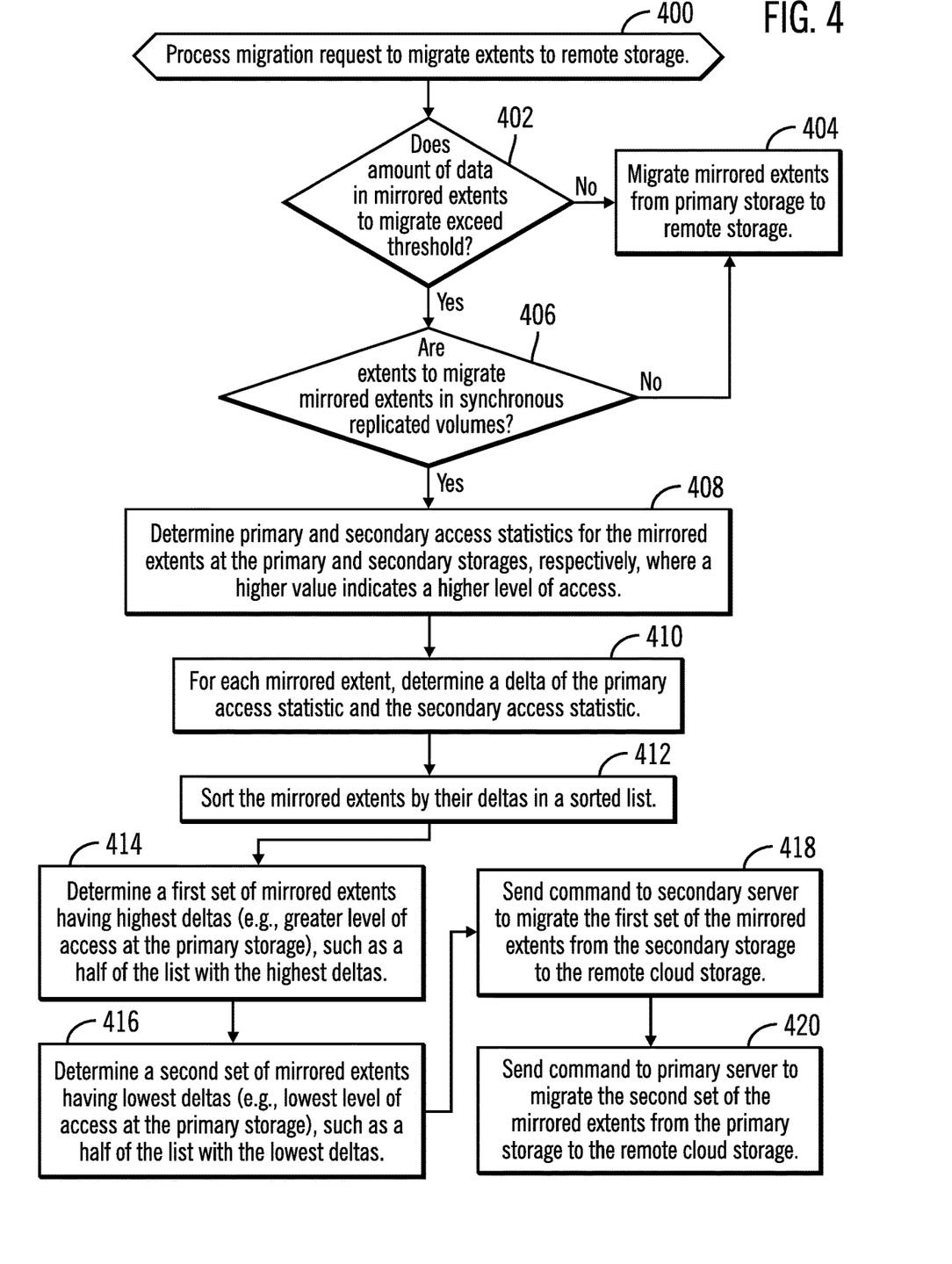
FIG. 4 illustrates an embodiment of operations to select the primary storage server or secondary storage server to migrate mirrored extents to the remote storage.

FIG. 4 illustrates an embodiment of operations performed by the migration/recall manager 220 in the primary server $200_P$ and/or secondary server $200_S$ to perform migration of mirrored extents specified in a migration command or part of a scheduled migration operation. Upon processing (at block 400) a migration request to migrate mirrored extents at the primary storage system $100_P$ and the secondary storage system $100_S$, the migration/recall manager 220 determines (at block 402) whether the amount of data in the mirrored extents to migrate exceeds a threshold amount of data. If (at block 402) the threshold amount of data is not exceeded, then the migrated extents are migrated (at block 404) from the primary storage sever $200_P$ to the remote cloud storage 112 via the second network 114. If (at block 402) the mirrored extents exceed a size threshold but are not in synchronous replicated volumes, then control proceeds to block 404 to migrate just from the primary storage $102_P$. If (at block 406) the extents to migrate are in a synchronous replicated volume and exceed the threshold size, then a determination is made (at block 408) of the primary $300_P$ and secondary $300_S$ access statistics for the mirrored extents at the primary $102_P$ and secondary storages $102_S$, respectively, where a higher value indicates a higher level of access.

In one embodiment, the access statistics 300 may be for a rank or other section of the primary and secondary storages including the mirrored extents. The determined access statistics may comprise a read latency 306, a read activity, or an I/O activity 310 with respect to different ranks to use to determine which mirrored extents to migrate from the primary $100_P$ or secondary $100_S$ storage systems. In one embodiment, the migration/recall manager 220 may consider only one of the types of access statistics 306, 308 or 310 indicating a level of access with respect to the rank or section of storage including the mirrored extent. In a further embodiment, the migration/recall manager 220 may calculate an aggregate activity score based on two or more of the access statistics 306, 308, 310, such as an aggregate calculated according to the operations of FIG. 5. In the described embodiments, access statistics are maintained for a rank or section of the primary or secondary storage including the mirrored extent. In an alternative embodiments, access extents may be maintained for smaller groups of mirrored extents or for single extents or other groupings of data units, such as tracks, blocks, etc.

For each mirrored extent to migrate, the migration/recall manager 220 may determine (at block 410) a delta of the primary access statistic and the secondary access statistic that is being used, e.g., 306, 308 and/or 310, for the rank 304 in the primary $102_P$ and secondary $102_S$ storages including the mirrored extent. The mirrored extents to migrate may then be sorted (at block 412) in a sorted list. The recall/migration manager 220 determines (at block 414) a first set of mirrored extents to migrate having highest deltas (e.g., relatively greater level of access at the primary storage than the secondary storage), such as a half of the sorted list with the highest deltas. A determination is made (at block 416) of a second set of mirrored extents to migrate having lowest deltas (e.g., relatively lower level of access at the primary storage than the secondary storage), such as a half of the sorted list with the lowest deltas.

The recall/migration manager 220 may then send (at block 418) a command to the secondary storage server $200_S$ to migrate the first set of the mirrored extents having highest level of access from the secondary storage $102_S$ to the remote cloud storage 112. The recall/migration manager 220 may further send (at block 420) a command to the primary storage server $200_P$ to migrate the second set of the mirrored extents from the primary storage $102_P$ to the remote cloud storage 112.

With the embodiment of FIG. 4, access 300 statistics are used to divide the mirrored extents into a first group of mirrored extents stored in sections or ranks having a relatively higher level of access at the primary storage $102_P$ than the secondary storage $102_S$ than a second group of mirrored extents. The described embodiments operate to have the primary storage server $200_P$, which has greater processing burdens than the secondary storage server $200_S$, manage the migration of mirrored extents on ranks of storage that are experiencing a lower level of access at the primary storage $102_P$. This reduces the processing burdens on the primary storage server of having to handle migration of mirrored extents from ranks or sections of the primary storage $102_P$ already experiencing a high level of activity from host I/O access. Having to handle host I/O access to extents on a rank whose extents are being migrated adds an extra level of processing burden to the primary storage server handling those operations.

For instance, the primary storage server $200_P$ handles the migration of mirrored extents on ranks having a lower delta, indicating a relatively low level of activity at the primary storage server, because the primary storage server $200_P$ will experience a lower level of host access to those low delta ranks or sections of the primary storage $102_P$ having the mirrored extents during migration, which reduces the processing burdens of having to handle host I/O to mirrored extents that are being migrated. Further, the secondary storage server $200_P$ handles the migration of mirrored extents on ranks having a higher delta, indicating a relatively higher level of activity at the primary storage server $102_P$, to save the primary storage server $200_P$ from having to further burden an overloaded rank with the migration of mirrored extents on a rank or section experiencing a high level of host access. In this way, the primary storage server $200_P$ is relieved of the burden of having to migrate those mirrored extents on ranks that are experiencing the highest level of access at the primary storage server $200_P$. The primary storage server $200_P$ will however handle the migration of the mirrored extents experiencing the lowest level of access at the primary storage server $200_P$, which can be migrated with a lower likelihood of being interrupted by host I/O access.

Figure 5:
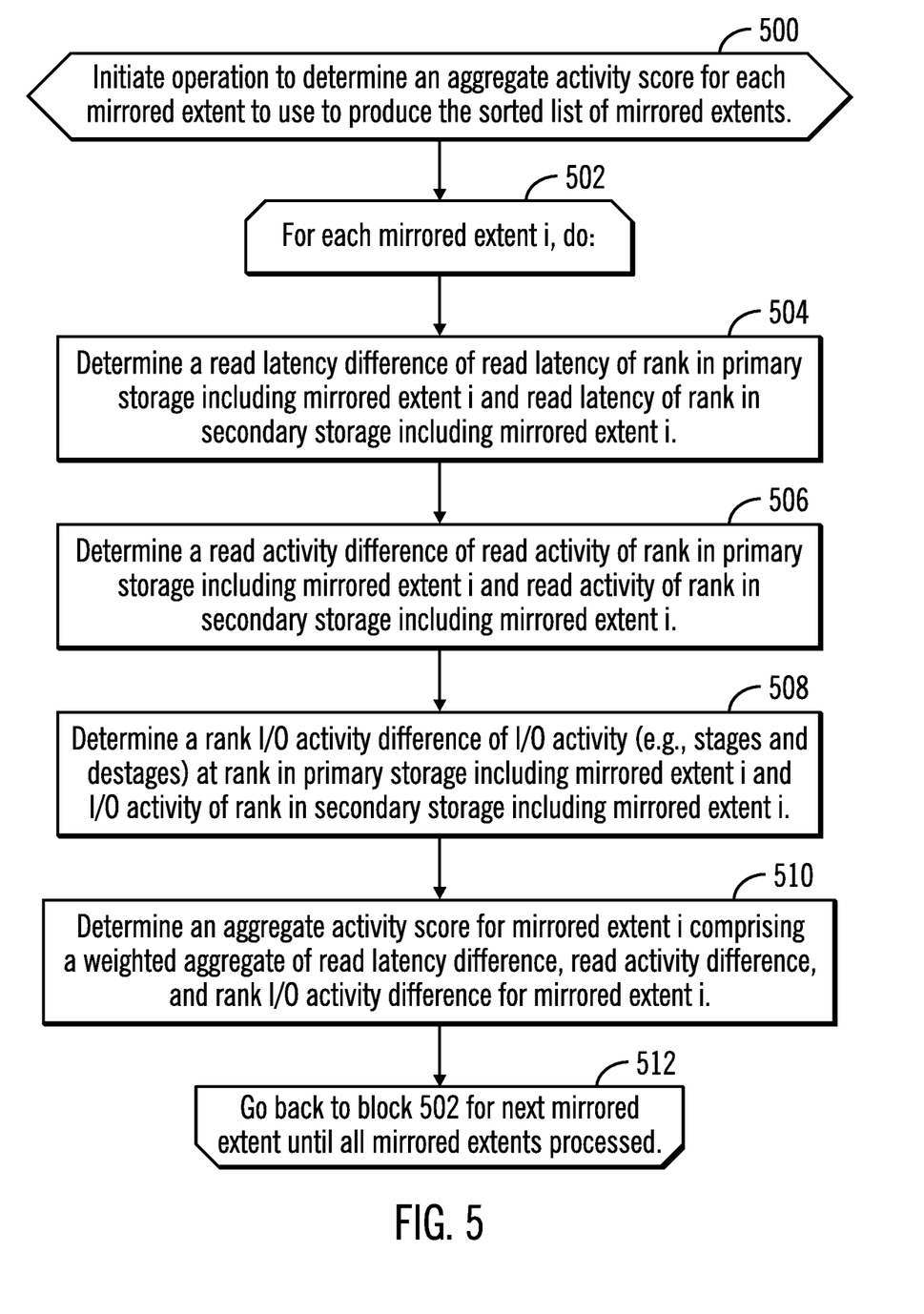
FIG. 5 illustrates an embodiment of operations to determine an aggregate activity score for mirrored extents based on multiple access statistics.

FIG. 5 illustrates an embodiment of operations performed by the migration/recall manager 220 to calculate an aggregate activity score based on the read latency 306, read activity 308, and I/O activity 310 to use to sort the mirrored extents for migration. Upon initiating (at block 500) the operation to determine the aggregate activity score for mirrored extents to produce the sorted list, the migration/recall manager 220 performs the operations at blocks 502 through 512 for each mirrored extent i to migrate. Determinations are made of: of a read latency difference (at block 504) of read latency 306 of a rank 304 in primary storage 302 including mirrored extent i in the primary access statistics $300_P$ and read latency 306 of a rank 304 in a secondary storage 302 including mirrored extent i in secondary access statistics $300_S$; a read activity difference (at block 506) of read activity 308 of rank 304 in primary storage $102_P$ including mirrored extent i in primary access statistics $300_P$ and read activity 308 of rank 304 in secondary storage $102_S$ including mirrored extent i in secondary access statistics $300_S$; and a rank I/O activity difference of I/O activity 310 (e.g., stages and destages) at a rank 304 in primary storage $102_P$ including mirrored extent i in primary access statistics $300_P$ and I/O activity 310 of rank 304 in the secondary storage $102_S$ including mirrored extent i in secondary access statistics $300_S$. The migration/recall manager 220 determines (at block 510) an aggregate activity score for mirrored extent i comprising a weighted aggregate of read latency difference, read activity difference, and rank I/O activity difference for mirrored extent i. Different ratios may be used to weight the read latency, read activity, and rank I/O differences.

With the embodiment of FIG. 5, multiple different access statistics may be used to determine an aggregate activity score that reflects different types of access statistics to provide a more overall measure of access of ranks including mirrored extents to use to sort the mirrored extents to determine how to divide mirrored extents to migrate between the primary $200_P$ and secondary $200_S$ storage servers.

Figure 6:
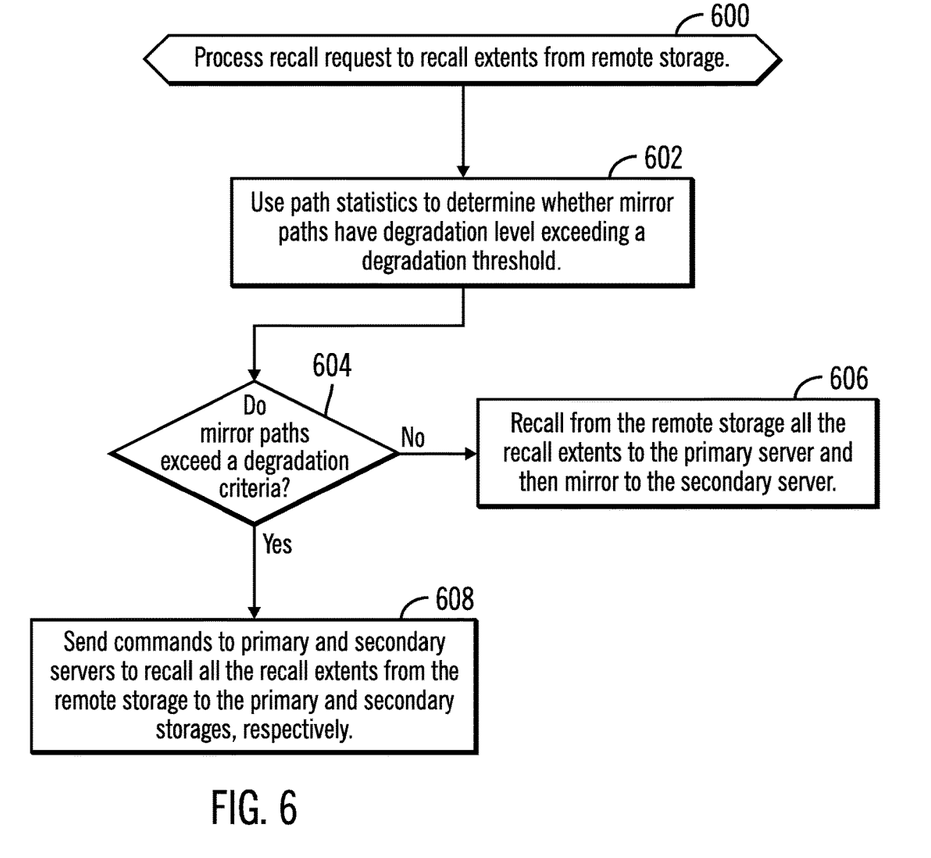
FIG. 6 illustrates an embodiment of operations to select the primary storage server or secondary storage server to recall mirrored extents from the remote storage.

FIG. 6 illustrates an embodiment of operations performed by the migration/recall manager 220 in the primary server $200_P$ and/or secondary server $200_S$ to recall mirrored extents from the remote cloud storage 112 in a recall command or part of a scheduled recall operation. Upon processing (at block 600) a migration request to recall mirrored extents from the remote cloud storage 112, the migration/recall manager 220 uses path statistics 700 to determine (at block 602) a degradation level on the mirror paths 110, as described with respect to FIGS. 7 and 8, which may be based on bandwidth utilization, number of low link response time transfers, ratio of successful to unsuccessful transfer, and whether the paths are in a high failure mode. If (at block 604) the degradation level does not exceed a degradation criteria or threshold, i.e., the mirror paths 110 are not sufficiently degraded, then the migration/recall manager 220 sends (at block 606) a command to the primary storage server $200_P$ to recall the extents from the remote cloud storage 112 to the primary storage $102_P$. After recall by the primary server $200_P$ only, the recalled extents are mirrored to the secondary storage $102_S$ over mirror paths 110. If (at block 604) the degradation level satisfies the degradation criteria, i.e., is sufficiently degraded, then the migration/recall manager 220 sends (at block 608) commands to both the primary $300_P$ and secondary $300_S$ servers to have each independently recall the extents from the remote storage 112 to the primary $102_P$ and secondary storages $102_S$.

With the embodiment of FIG. 6, a determined degradation level on the mirror paths 110 is used to determine whether to have each of the primary $200_P$ and secondary $200_S$ servers recall the recall extents if the mirror paths 110 instead of recalling to the primary server $200_P$ and then mirroring to the secondary server $200_S$ on the mirror paths 110. The described embodiments avoid using the mirror paths 110 if sufficiently degraded for recall. In this way, the described embodiments allow for a faster recall if the second network 114 is operating at higher speeds than the degraded mirror paths 110 and recalling just from the second network 114 reduces bandwidth and utilization burdens on the mirror paths 110 while they are being used to mirror data from the primary server $200_P$ to the secondary server $200_S$ in a degraded state.

Figure 7:
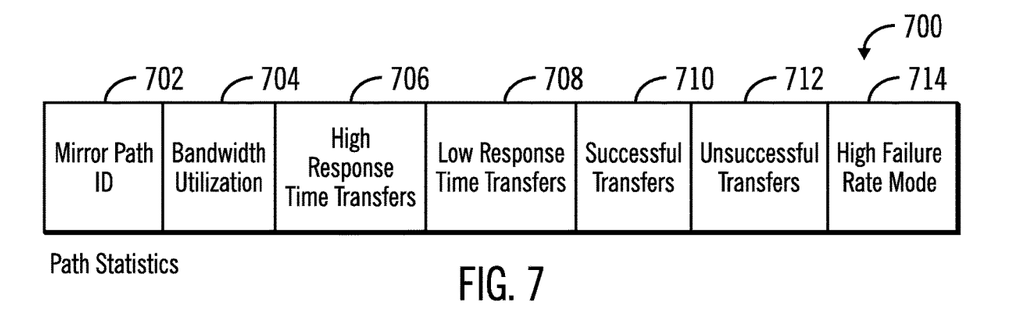
FIG. 7 illustrates an embodiment of path statistics used to determine servers to use for recall operations.

FIG. 7 illustrates an embodiment of path statistics 700 maintained for a mirror path in the mirror paths 110, and may include: a mirror path identifier (ID) 702, such as port ID, etc. for one of the mirror paths 110; bandwidth utilization 704 indicating an amount or percentage of bandwidth on the mirror path 702 being utilized; high response time transfers 706 comprising a number of transfers of mirrored data on the mirror path 702 from the primary server $200_P$ to the secondary server $200_S$ that have a link response time within a range of high response times, indicating poor path performance; low response time transfers 708 comprising a number of transfers of mirrored data on the mirror path 702 from the primary server $200_P$ to the secondary server $200_S$ having link response times within a range of low response times, indicating acceptable/good path performance; successful transfers 710 comprising a number of successful transfers of mirrored data on the mirror path 702; unsuccessful transfers 712 comprising a number of unsuccessful transfers of mirrored data on the mirror path 702; and indication of whether the mirror path 702 is operating in a high failure rate mode 714, as separately determined by a path manager, in which transfers on the path 702 are throttled to recover the path 702 without suspending the path 702 and during which performance is degraded on the path 702.

The path statistics 700 may be gathered periodically by a path manager or the operating system 208 during data mirroring operations on the mirror paths 110, such as at predetermined intervals, after a predetermined number of transfers, etc.

Figure 8:
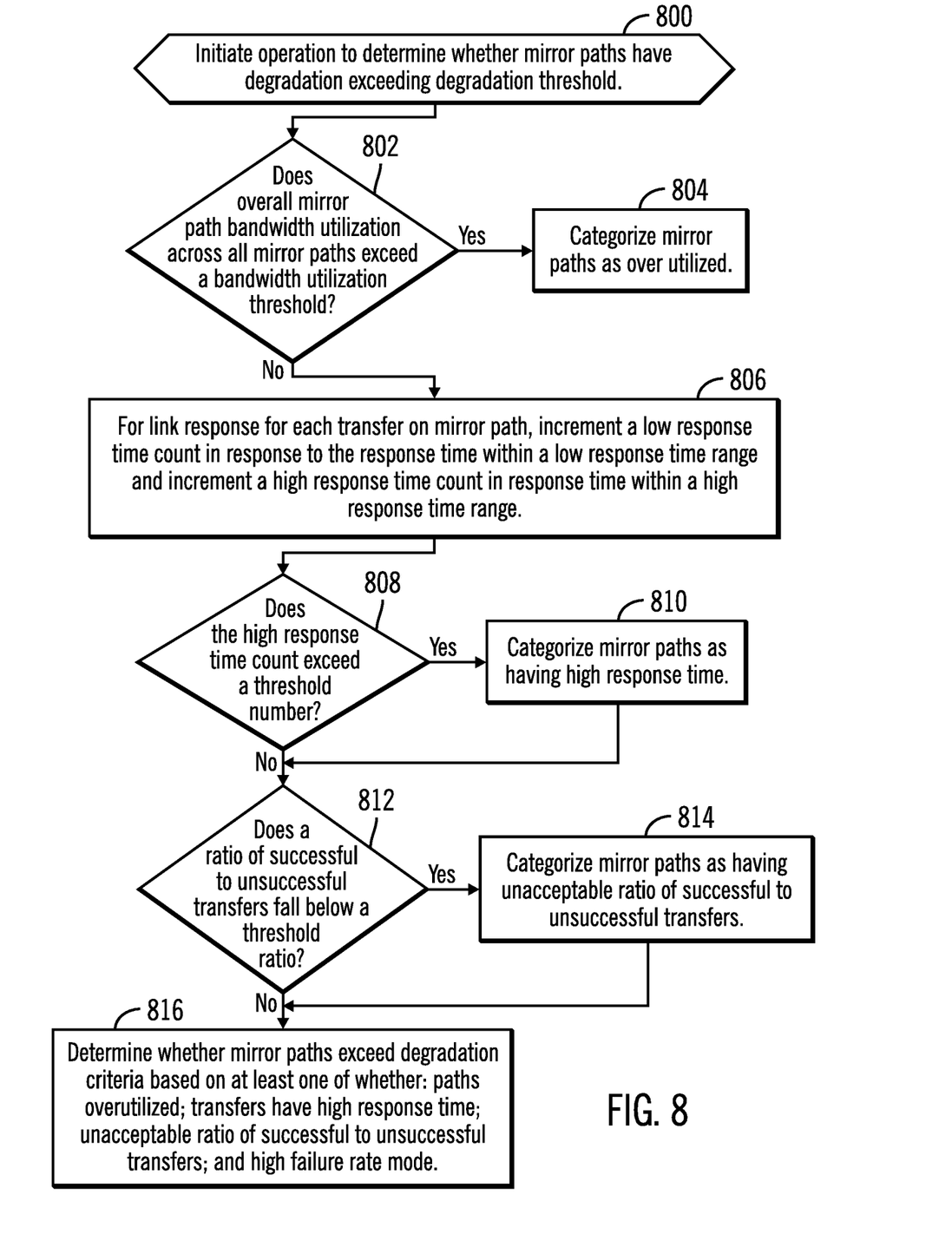
FIG. 8 illustrates an embodiment of operations to determine whether mirror paths are degraded.

FIG. 8 illustrates an embodiment of operations performed by the migration/recall manager 220 to determine whether the mirror paths 110 are sufficiently degraded to have both the primary $200_P$ and secondary $200_S$ storage servers separately recall extents. Upon initiating (at block 800) an operation to determine whether mirror paths 110 are degraded, the migration/recall manager 220 determines (at block 802) whether overall mirror path bandwidth utilization 704 exceeds a bandwidth threshold. If so, the mirror paths are categorized (at block 804) as over utilized. If (at block 802) the paths are not overutilized or after indicating (at block 804) paths as overutilized, for each link response for each transfer made on a mirror path 110, a low response time transfers 708 is incremented (at block 806) in response to the link response time for the transfer being within a low response time range and a high response time transfers 706 is incremented in response to the link response time for the transfer being within a high response time range. If (at block 808) the high response time transfers 706 exceeds a threshold number, then the mirror paths are categorized (at block 810) as having a high response time, which is undesirable.

From the no branch of block 808 or block 810, if (at block 812) a ratio of successful transfers 710 to unsuccessful transfers 712 exceeds a threshold ratio, then the mirror paths are categorized (at block 814) as having an unacceptable ratio of successful 710 to unsuccessful 712 transfers. The migration/recall manager 220 determines (at block 816) whether mirror paths exceed a degradation criteria, indicating sufficiently degraded, based on at least one of whether mirror paths 110 are categorized as overutilized; having a high response time; having an unacceptable ratio of successful 710 to unsuccessful 712 transfers; and in high failure rate mode 714.

In making the determination of sufficiently degraded performance, the migration/recall manager 220 may require that all criteria indicate degraded performance to determine that the mirror paths are degraded. Alternatively, the mirror paths may be determined to be degraded if less than all or just one of the criteria indicate degraded. In embodiments where there are multiple mirror paths, a determination that the mirror paths as a whole are degraded may require that the degradation criteria indicating degradation, such as bandwidth utilization, high response time, unacceptable ratio of successful transfers, and high failure rate mode, is determined for all the mirror paths, some predetermined number or percentage of paths or for just one path.

With the embodiment of FIG. 8, multiple criteria concerning mirror path functioning, such as bandwidth utilization, high response time, unacceptable ratio of successful transfers, and high failure rate mode, determined for the different mirror paths may be used to determine whether the mirror paths, comprising one or more paths, are degraded to an extent that recall extents should be recalled from the remote storage 112 to both the primary $100_P$ and secondary $100_S$ storage systems to avoid using the degraded mirror paths 110.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
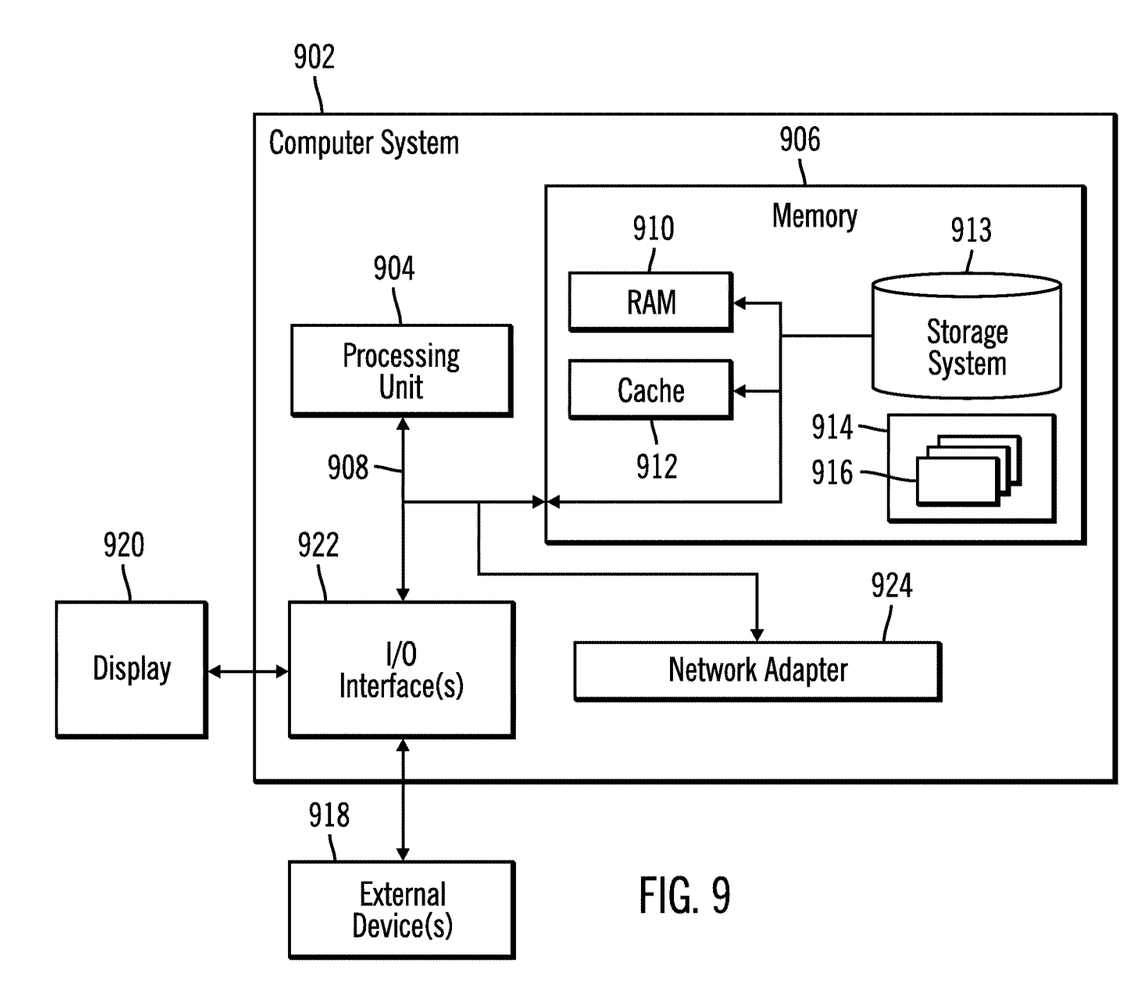
FIG. 9 illustrates a computing environment in which the components of FIG. 1 may be implemented.

The computational components of FIG. 1, including the servers $200_P$, $200_S$, $200_H$, and remote cloud storage 112 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for recalling extents from a third storage to a primary storage and a secondary storage, wherein the computer program product comprises a computer readable storage medium having program instructions executable by a processor to cause operations, the operations comprising:
    receiving a recall request to recall extents from the third storage that were migrated from the primary storage or the secondary storage to the third storage;
    determining whether mirror paths used to migrate extents from the primary storage to the secondary storage exceed a degradation criteria; and
    sending commands to cause the recall extents to be recalled from the third storage to both the primary storage and the secondary storage in response to determining that the mirror paths exceed the degradation criteria.

2. The computer program product of claim 1, wherein the operations further comprise
    in response to determining that the mirror paths do not exceed the degradation criteria, performing:
        sending commands to cause the recall extents to be recalled from the third storage to the primary storage in response to determining that the mirror paths do not exceed the degradation criteria; and
        copying the recall extents recalled to the primary storage to the secondary storage over the mirror paths, wherein the recall extents are not recalled to the secondary storage from the third storage.

3. The computer program product of claim 1, wherein the determining whether the mirror paths exceed the degradation criteria further comprises:
    determining bandwidth utilization on the mirror paths, wherein the mirror paths exceed the degradation criteria in response to the bandwidth utilization on the mirror paths exceeding a bandwidth utilization threshold.

4. The computer program product of claim 1, wherein the operations further comprise:
    determining link response times for data transferred on the mirror paths from the primary storage to the secondary storage; and
    incrementing a high response time transfers for each of the link response times falling within a high response time range, wherein the mirror paths exceed the degradation criteria in response to the high response time transfers exceeding a threshold number of transfers having high response times.

5. The computer program product of claim 1, wherein the operations further comprise:
    determining a ratio of successful transfers on the mirror paths to unsuccessful transfers on the mirror paths, wherein the mirror paths exceed the degradation criteria in response to the ratio falling below a threshold ratio.

6. The computer program product of claim 1, wherein the operations further comprise:
    determining whether the mirror paths are indicated as having a high failure rate, wherein the mirror paths exceed the degradation criteria in response to a threshold number of the mirror paths indicated as having the high failure rate.

7. The computer program product of claim 1, wherein the mirror paths exceed the degradation criteria in response to at least two of:
    a bandwidth utilization on the mirror paths exceeding a bandwidth utilization threshold;
    a high response time count of transfers on the mirror paths within a high response time range exceeding a high response time threshold number;

a ratio of success transfers on the mirror paths to unsuccessful transfers on the mirror paths falling below a threshold ratio; and a threshold number of mirror paths indicated has having a high failure rate.

8. The computer program product of claim 1, wherein Input/Output (I/O) requests from hosts are directed to the primary storage, and wherein the third storage comprises cloud based storage accessible to a primary server managing the primary storage and a secondary server managing the secondary storage.

9. A system for recalling extents from a third storage to a primary storage and a secondary storage, comprising:
   a processor; and
   a computer readable storage medium having program instructions that when executed by the processor to cause operations, the operations comprising:
      receiving a recall request to recall extents from the third storage that were migrated from the primary storage or the secondary storage to the third storage;
      determining whether mirror paths used to migrate extents from the primary storage to the secondary storage exceed a degradation criteria; and
      sending commands to cause the recall extents to be recalled from the third storage to both the primary storage and the secondary storage in response to determining that the mirror paths exceed the degradation criteria.

10. The system of claim 9, wherein the operations further comprise
   in response to determining that the mirror paths do not exceed the degradation criteria, performing:
      sending commands to cause the recall extents to be recalled from the third storage to the primary storage in response to determining that the mirror paths do not exceed the degradation criteria; and
      copying the recall extents recalled to the primary storage to the secondary storage over the mirror paths, wherein the recall extents are not recalled to the secondary storage from the third storage.

11. The system of claim 9, wherein the determining whether the mirror paths exceed the degradation criteria further comprises:
   determining bandwidth utilization on the mirror paths, wherein the mirror paths exceed the degradation criteria in response to the bandwidth utilization on the mirror paths exceeding a bandwidth utilization threshold.

12. The system of claim 9, wherein the operations further comprise:
   determining link response times for data transferred on the mirror paths from the primary storage to the secondary storage; and
   incrementing a high response time transfers for each of the link response times falling within a high response time range, wherein the mirror paths exceed the degradation criteria in response to the high response time transfers exceeding a threshold number of transfers having high response times.

13. The system of claim 9, wherein the operations further comprise:
   determining a ratio of successful transfers on the mirror paths to unsuccessful transfers on the mirror paths, wherein the mirror paths exceed the degradation criteria in response to the ratio falling below a threshold ratio.

14. The system of claim 9, wherein the mirror paths exceed the degradation criteria in response to at least two of:
   a bandwidth utilization on the mirror paths exceeding a bandwidth utilization threshold;
   a high response time count of transfers on the mirror paths within a high response time range exceeding a high response time threshold number;
   a ratio of success transfers on the mirror paths to unsuccessful transfers on the mirror paths falling below a threshold ratio; and
   a threshold number of mirror paths indicated has having a high failure rate.

15. A method for migrating mirrored extents at a primary storage and a secondary storage to a third storage, comprising:
   receiving a recall request to recall extents from the third storage that were migrated from the primary storage or the secondary storage to the third storage;
   determining whether mirror paths used to migrate extents from the primary storage to the secondary storage exceed a degradation criteria; and
   sending commands to cause the recall extents to be recalled from the third storage to both the primary storage and the secondary storage in response to determining that the mirror paths exceed the degradation criteria.

16. The method of claim 15, further comprising:
   in response to determining that the mirror paths do not exceed the degradation criteria, performing:
      sending commands to cause the recall extents to be recalled from the third storage to the primary storage in response to determining that the mirror paths do not exceed the degradation criteria; and
      copying the recall extents recalled to the primary storage to the secondary storage over the mirror paths, wherein the recall extents are not recalled to the secondary storage from the third storage.

17. The method of claim 15, wherein the determining whether the mirror paths exceed the degradation criteria further comprises:
   determining bandwidth utilization on the mirror paths, wherein the mirror paths exceed the degradation criteria in response to the bandwidth utilization on the mirror paths exceeding a bandwidth utilization threshold.

18. The method of claim 15, further comprising:
   determining link response times for data transferred on the mirror paths from the primary storage to the secondary storage; and
   incrementing a high response time transfers for each of the link response times falling within a high response time range, wherein the mirror paths exceed the degradation criteria in response to the high response time transfers exceeding a threshold number of transfers having high response times.

19. The method of claim 15, further comprising:
   determining a ratio of successful transfers on the mirror paths to unsuccessful transfers on the mirror paths, wherein the mirror paths exceed the degradation criteria in response to the ratio falling below a threshold ratio.

20. The method of claim 15, wherein the mirror paths exceed the degradation criteria in response to at least two of:
   a bandwidth utilization on the mirror paths exceeding a bandwidth utilization threshold;

a high response time count of transfers on the mirror paths within a high response time range exceeding a high response time threshold number;
a ratio of success transfers on the mirror paths to unsuccessful transfers on the mirror paths falling below a threshold ratio; and
a threshold number of mirror paths indicated has having a high failure rate.

\* \* \* \* \*